United States Patent
Everett

Patent Number: 5,896,955
Date of Patent: Apr. 27, 1999

[54] PARTITIONED BICYCLE BRAKE SHOE PAD OF DIFFERENT COMPOSITIONS ON THE BRAKING SURFACE FOR SIMULTANEOUS CONTACT WITH THE RIM

[76] Inventor: Richard C. Everett, 225 Sunshine La., West Linn, Oreg. 97068

[21] Appl. No.: 08/944,646

[22] Filed: Oct. 6, 1997

Related U.S. Application Data

[63] Continuation of application No. 08/602,494, Feb. 20, 1996, abandoned, which is a continuation of application No. 08/373,846, Jan. 18, 1995, Pat. No. 5,555,959, which is a continuation of application No. 07/971,936, Nov. 5, 1992, abandoned.

[51] Int. Cl.$^6$ ...................................................... B62L 1/02
[52] U.S. Cl. ................................. 188/24.12; 188/251 R; 188/250 B; 188/73.1
[58] Field of Search ................................ 188/1.11, 24.11, 188/24.12, 73.1, 250 B, 250 E, 250 G, 251 R, 256, 24.14

[56] References Cited

U.S. PATENT DOCUMENTS

| | | | |
|---|---|---|---|
| 2,355,419 | 8/1944 | Bruce | 188/251 R |
| 4,029,181 | 6/1977 | Lewis | 188/250 B |
| 4,036,333 | 7/1977 | Mathauser | 188/250 B X |
| 4,135,606 | 1/1979 | Lewis | 188/256 X |
| 4,315,563 | 2/1982 | Hayashi et al. | 188/73.1 |
| 4,470,483 | 9/1984 | Holtz | 188/24.11 |
| 5,064,027 | 11/1991 | Akamatsu | 188/73.1 |
| 5,555,959 | 9/1996 | Everett | 188/73.1 |

*Primary Examiner*—Peter M. Poon
*Assistant Examiner*—Pamela J. Lipka
*Attorney, Agent, or Firm*—Edward E. Roberts

[57] ABSTRACT

A brake shoe having a metallic support or backbone member with a brake pad formed of at least two portions, each of a separate compound or composition, with each compound pre-selected to effect a separate result for each of the pad portions. The portions are configured, arranged and dimensioned so that each (and all) pad portions have a braking surface in contact with the rim generally simultaneously. The partitioned brake pad is formed of different combinations of multi-rubber or elastomers, not a particular combination, to improve wet and dry braking with one pad or the same pad. The selection of multi-rubber or elastomers could be used to stop squealing and grabbing, while also giving the pad stopping power at the same time; or a different combination could be used in wet and dry conditions, or a combination of compounds may be utilized for different partitions for racing conditions, or the like.

9 Claims, 1 Drawing Sheet

PARTITIONED BICYCLE BRAKE SHOE PAD OF DIFFERENT COMPOSITIONS ON THE BRAKING SURFACE FOR SIMULTANEOUS CONTACT WITH THE RIM

This is a continuation of application Ser. No. 08/602,494 filed on Feb. 20, 1996, now abandoned, which is a continuation of application of Ser. No. 08/373,846 filed on Jan. 18, 1995, now U.S. Pat. No. 5,555,959, which is a continuation of Ser. No. 07/971,936 filed on Nov. 5, 1992 now abandoned.

BACKGROUND OF THE INVENTION

The background of the invention will be discussed in two parts:

FIELD OF THE INVENTION

This invention relates to bicycle brakes and more particularly to bicycle brake shoes having dissimilar first and second pads for providing uniform braking and wear.

DESCRIPTION OF THE PRIOR ART

Some bicycles have brake assemblies mounted to the frame for gripping of the rim in response to operator manipulation of brake levers. Such brake assemblies generally include brake shoes which are movably mounted on caliper assemblies which bridge the rim, with such brake shoes having a brake pad of friction material for abuttingly and frictionally engaging the rim for slowing or stopping of the bicycle. The majority of such brake pads have some form of design in the engaging surface to promote friction, somewhat similar to the tread design of tires.

The material composition of the brake shoe contributes to its ability to stop the bicycle. In some prior art brake shoes, the composition is a friction material such as plastic or rubber impregnated with metal particles. Another prior art brake shoe employs two adjacent brakes on each caliper lever, with the brake shoes arranged for use in opposing pairs (U.S. Pat. No. 4,036,333). One pair of brake shoes is formed of a material suitable for use in dry weather. Prior to operation of the bicycle, the rider manually positions one pair of opposing shoes for use on that ride for either wet or dry weather. To use the other pair of brake shoes, the rider must again make a manual adjustment to place the other pair of shoes in contact with the bicycle rim.

Such devices are illustrative of the many and varied arrangements whereby attempts have been made to improve the braking of bicycles. Many of the prior art brake pads tend to squeal or chatter upon application, and in virtually all instances provide uneven wear of the brake pads at the point of engaement resulting in uneven application of force to the rim. Such brake pads have been generally rectangular in configuration with the fastening stud at the mid-point thereof.

It is an object of the present invention to provide a new and improved brake shoe for a bicycle.

It is another object of the present invention to provide a new and improved brake shoe with improved braking and wear.

It is a further object of the present invention to provide a new and improved brake shoe having a partitioned pad, with at least two pads formed of dissimilar material, with the pad partitions configured for simultaneous engagement with the bicycle rim.

SUMMARY OF THE INVENTION

The foregoing and other objects of the invention are accomplished by providing a brake shoe having a metallic support or backbone member with a brake pad formed of at least two partitions, each of a separate composition to effect a separate result for each of the two compositions. The partitions are configured, arranged and dimensioned so that each (and all) partitions have a braking surface in contact with the rim generally simultaneously. The partitioned brake pad is formed of different combinations of multi-rubber or elastomers, not a particular combination, to improve wet and dry braking with one pad or the same pad. The selection of multi-rubber or elastomers could be used to stop squealing and grabbing, while also giving the pad stopping power at the same time; or a different combination could be used in wet and dry conditions, or a combination of compounds may be utilized for different partitions for racing conditions, or the like.

Other objects, features and advantages of the invention will become apparent from a reading of the specification, when taken in conjunction with the drawings, in which like reference numerals refer to like elements in the several views.

DESCRIPTION OF THE PREFERRED EMBODIMENT

Figure 1:
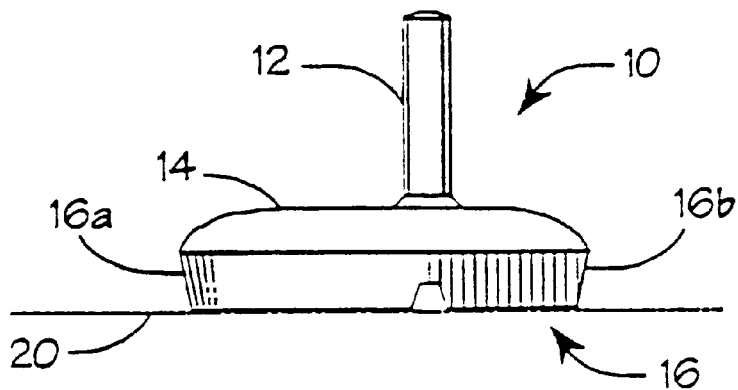
FIG. 1 is a side elevation view of a brake shoe having a multiple partition brake pad according to the invention.

Referring now to the drawings, and particularly to FIG. 1, there is shown a brake shoe assembly, generally designated 10, and includes a fastening means, such as a threaded stud member 12 secured to a support member, such as the backbone portion 14 of the brake shoe assembly 10. The brake shoe 10 has pad means in the form of pad, generally designated 16, having first and second pad partitions 16a (shown plain) and 16b (shown with cross-hatching), each formed of a different compound of friction material cured or molded to the backbone portion 14 at the same time. The pad partitions are in alignment on the support member or backbone portion 14 and in alignment relative to the direction of travel of the rim of the bicycle. In accordance with the present invention, the pad partitions 16a and 16b are each formed of compounds which provide a desired characteristic.

For example, the left pad partition 16a may be formed of a compound which provides squeal and grabbing control stabilization while the right pad portion 16b may be formed of a compound which provides high friction stopping power. Correspondingly, the compound selected for the particular characteristic may vary according to whether one wants the brake pad 16 to be used primarily under wet weather conditions or dry weather conditions.

As shown in FIG. 1, the leftmost (as viewed in the drawings) pad partition 16a covers a greater proportion of the length of the brake shoe pad 16 (approximately 60%, for example). In any event, the lower surface of the pad 16 is generally coplanar, as indicated by line 20, that is the braking surfaces, or rim-engaging surfaces of the two pad partitions 16a and 16b lie in a common plane, or substantially in a common plane, so that the required effect of each pad partition 16a, 16b, is accomplished on generally simultaneous engagement with the rim by both brake pad partition surfaces.

Figure 2:
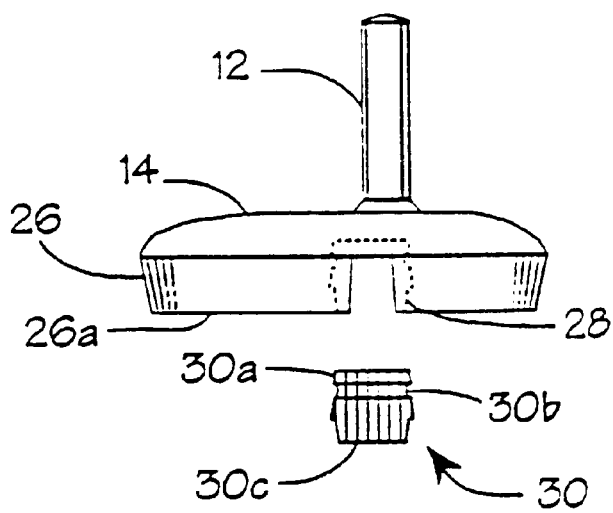
FIG. 2 is a side elevational view, partially exploded, of an alternative embodiment of a brake shoe having a multiple partition brake pad according to the invention.
Figure 3:
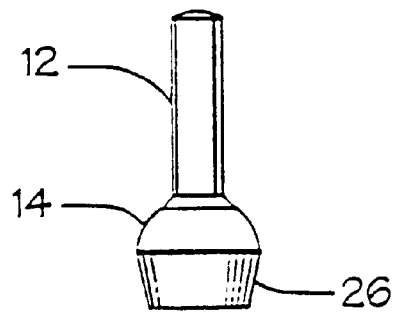
FIG. 3 is an end view of the brake shoe of FIG. 2.
Figure 4:
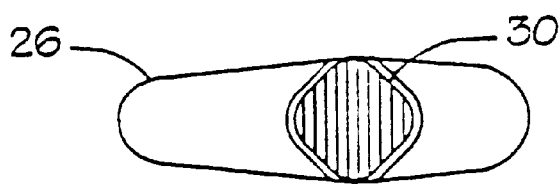
FIG. 4 is a bottom view of the brake shoe of FIG. 2.

By reference to FIGS. 2 through 4, an alternative embodiment of brake shoe pad is shown, the pad having a main body pad portion 26 which encompasses the periphery and a major part of the body of the volume available for a brake shoe pad. The main body pad portion 26 is provided with a molded formed opening 28 configured and dimensioned for receiving a second pad partition 30, which is formed as a separate and separable snap insert. The pad portion 30 has a smaller upper dimension at 30a, with a peripheral recess 30b therebelow, with the bottom surface 30c being generally planar.

The recess or opening 28 is configured for mating detenting coacting engagement with the portions 30a and 30b of the pad portion 30 with the surface 30c being generally coplanar with the planar braking surface 26a of the pad portion 26 on insertion. With an insert arrangement, the main body portion of the pad, that is, pad partition 26a may be formed a compound for stopping power, while the insert pad partition may be formed of a compound suitable for squeal or grabbing stabilization. In addition, the insert pad portion 30 may be formed of different colors as a means of color coding a plurality of different inserts, each being formed of a different compound for different desired characteristics. The insert pad partition, as shown in FIGS. 2 and 4 is generally diamond shaped with the geometric center thereof on in alignment with the axial centerline of the stud member 12, this line ordinarily being the line of greatest force on application of the brakes.

Figure 5:
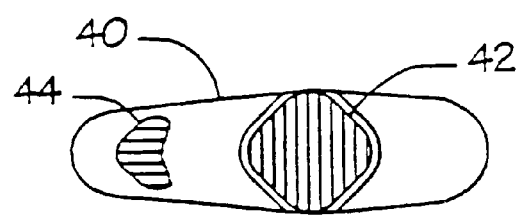
FIG. 5 is a bottom view of yet another alternative embodiment of a brake shoe having a multiple partition brake pad according to the invention.

FIG. 5 shows a bottom view of yet another brake shoe pad embodiment, in which the pad includes a main body portion 40, with first and second pad portions 42 and 44, each at different locations and each of a compound different from the other and different from the main body portion 40.

For compound selection of the pad portions or partitions, any form of a multi-rubber or elastomeric compound may be utilized, with different combinations of multi-rubber or elastomers, not a particular combination, to improve wet and dry braking with one pad assembly. The multi-rubber elastomers could be used to stop squealing and grabbing, while giving the pad stopping power at the same time. Alternatively, a different combination could be used in wet and dry conditions, or a combination of compounds for racing conditions, or the like, when the pad assembly is engaging the bicycle rim using such multi-rubber or elastomers pads. It is to be understood that both pads for a given rim would be identical, and would engage the rim substantially at the same time.

A pad of only one compound or composition engaging a rim has a short-coming of not being able to stop a bicycle in the same manner for both wet and dry weather conditions, that is, controlling squeal (grabbing) and stopping, or cleaning the rim and stopping, etc. A single compound brake shoe pad can only do one or the other.

In accordance with the invention as herein described, the partitioned or apportioned or portioned pad, unitarily formed or with one or more inserts, with a pre-selected variety of multi-rubber or elastomers compound can do multi-service with one pad surface in contact with the rim. The compound selected for the dry braking condition keeps the wet braking compound from grabbing (squealing) or slipping by selectively using clay or graphite in the dry compound. This controls the grabbing of the high friction compound with the rim. The dry braking compound controls the grabbing by smoothing out the stopping by the hardness of the compound selected and controls the friction with clay or graphite, the clay or graphite preventing the grabbing. The high friction compound controls the stopping power or friction by the proportion in area to the dry compound and the amount of silicon dioxides or friction abrasives in the wet compound.

Thus the two interacting compounds in the right proportions give the best compromise in stopping in wet and dry stopping conditions. Squeal and grabbing stabilizing of wet compound is accomplished with a rubber or elastomers base made with clay and graphite fillers to control squealing and friction grabbing, and can be made in red or other colors to identify the compound from others. Friction or dry compounds are for stopping power in wet conditions and can be made with a rubber or elastomers base with an abrasive of silicon dioxides or iron dioxides or other abrasives and made blue or other colors to identify the compound from others.

All compounds will preferably have some form of curative (sulfur or others), an anti-aging chemical, and common heat stabilizer. The compound will be molded to a desired shape and cured with heat to form the unitary partitioned pad or the pad portions and pad insert.

In accordance with present invention, there has been shown and described a brake shoe pad assembly, in which, by partitioning, or by means of one or more inserts in a main pad body portion, individual parts can be formed of different compositions, each providing some desired characteristic to the braking of the bicycle. While there has been shown and described preferred embodiments, it is to be understood that various other adaptations and modifications may be made within the spirit and scope of the invention.

What is claimed is:

1. A brake shoe pad for a bicycle having a brake system urging a brake shoe pad against a wheel rim of the bicycle, the brake shoe comprising:

a plurality of pad portions, each having a rim engaging surface substantially coplanar with each other to engage the rim simultaneously and each being formed of a different elastomeric compound, each compound being pre-selected for imparting a different frictional characteristic to said brake shoe pad, one of said plurality of pad portions being formed as a main body portion of the brake shoe pad with at least one recess therein, and at least one other of said plurality of pad portions is formed as an insert, said recess and said one other pad portion being configured for mating coacting engagement;

said brake shoe pad includes a support member and said plurality of pad portions are aligned relative to one another and relative to said support member; and wherein said support member is elongate and said pad portions are molded as a unitary member affixed to the support member.

2. The brake shoe pad according to claim 1 wherein said pad portions are color coded to identify the said different frictional characteristic.

3. The brake shoe pad according to claim 1 wherein said inserts are replaceable.

4. The brake shoe pad according to claim 1 wherein the compound selected of at least one of the said pad portions is selected for stopping power and the compound of at least one other of said pad portions is selected for squealing control.

5. The brake shoe pad according to claim 4 wherein the compound of at least another of said pad portions is selected for rim cleaning.

6. A brake shoe pad for a bicycle having a brake system urging a brake pad against a wheel rim of the bicycle, the brake shoe pad having a plurality of pad portions, each having a rim engaging surface substantially coplanar with each other to engage the rim simultaneously and each being formed of a different elastomeric compound for imparting a different characteristic to said brake shoe pad, one of said plurality of pad portions being formed as a main body portion of the brake shoe pad with at least one recess therein, and at least one other of said plurality of pad portions is formed as an insert, said recess and said one other pad portion being configured for mating coacting engagement; and wherein each of said plurality of pad portions has a braking surface area different from any other portion.

7. The brake shoe pad according to claim 6 wherein the compound of one of said pad portions is selected for stopping power and another is selected for squealing control.

8. The brake shoe pad according to claim 6 wherein the compound of one of said pad portions is selected for rim cleaning.

9. The brake shoe pad according to claim 1 wherein said pad portions are color coded to identify the said different elastomeric compound.

* * * * *